United States Patent [19]

Haylock et al.

[11] Patent Number: 5,028,647
[45] Date of Patent: Jul. 2, 1991

[54] POLYESTER COMPOSITION CONTAINING AN ESTER OF AN ETHOXYLATED AROMATIC ALCOHOL

[75] Inventors: John C. Haylock, Dennysville, Me.; Harold W. Tuller, Long Valley; Nicholas Vanderkooi, Jr., Pompton Plains, both of N.J.

[73] Assignees: Allied-Signal Inc., Morristown, N.J.; The C.P. Hall Company, Chicago, Ill.

[21] Appl. No.: 323,107

[22] Filed: Mar. 13, 1989

Related U.S. Application Data

[63] Continuation of Ser. No. 83,932, Aug. 5, 1987, abandoned, which is a continuation of Ser. No. 922,909, Oct. 24, 1986, abandoned.

[51] Int. Cl.$^5$ .................................................. C08L 67/02
[52] U.S. Cl. ..................................... 524/290; 524/539
[58] Field of Search ............... 525/444, 438; 524/290, 524/291

[56] References Cited

U.S. PATENT DOCUMENTS

| | | | |
|---|---|---|---|
| 3,435,093 | 3/1969 | Cope | 260/857 |
| 3,516,957 | 6/1970 | Gray et al. | 260/22 |
| 3,560,605 | 2/1971 | Siggel | 525/438 |
| 3,639,527 | 2/1972 | Brinkmann et al. | 260/873 |
| 4,232,125 | 9/1980 | Bier et al. | 528/305 |
| 4,352,904 | 10/1982 | Deyrup | 524/292 |
| 4,357,268 | 11/1982 | Vanderkooi, Jr. et al. | 524/285 |
| 4,371,476 | 2/1983 | Newkirk | 524/290 |
| 4,412,040 | 10/1983 | Albee, Jr. et al. | 525/143 |
| 4,429,067 | 1/1984 | Barenberg | 524/299 |
| 4,435,546 | 3/1984 | Bier et al. | 525/418 |
| 4,486,564 | 12/1984 | Deyrup | 524/308 |
| 4,548,978 | 10/1985 | Garrison, Jr. | 524/314 |
| 4,558,085 | 12/1985 | Lee | 524/299 |
| 4,558,096 | 12/1985 | Boon et al. | 525/166 |
| 4,562,216 | 12/1985 | Kishida et al. | 523/433 |
| 4,585,978 | 10/1985 | Garrison, Jr. | 524/314 |

FOREIGN PATENT DOCUMENTS

| | | | |
|---|---|---|---|
| 2358441 | 2/1928 | France . | |
| 60-228554 | 10/1985 | Japan | 524/290 |
| 60-243135 | 12/1985 | Japan | 524/290 |
| 243137 | 12/1985 | Japan . | |
| 60-243173 | 12/1985 | Japan | 524/290 |
| WO85/03717 | 8/1985 | PCT Int'l Appl. . | |
| 1315699 | 10/1970 | United Kingdom . | |

Primary Examiner—Patricia Short
Attorney, Agent, or Firm—Brown Melanie L.; Roger H. Criss

[57] ABSTRACT

The present invention is a composition comprising a linear saturated polyester and from 0.5 to 30 percent by weight of the polyester of at least one ester of an ethoxylated polyfunctional alcohol having a molecular weight of from 500 to about 1,500. The ester is of an ethoxylated aromatic alcohol and a carboxylic acid wherein the ethoxylated aromatic alcohol has the formula

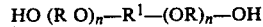

HO(RO)$_n$—R$^1$—(OR)$_n$—OH wherein, R is the same or different hydrocarbon radical of from 2 to 4 carbon atoms, n can be the same or a different integer of from 2 to 15; and R$^1$ is an aromatic radical preferably derived from an aromatic dialcohol, most preferably bisphenol A. The ethoxylated aromatic alcohol has greater than 20 carbon atoms. The acid is a carboxylic acid of from 1 to 25 and preferably 3 to 10 carbon atoms, and from 1 to 10 carboxyl groups. Preferably the acid has from 3 to 10 carbon atoms and one carboxyl group.

10 Claims, No Drawings

POLYESTER COMPOSITION CONTAINING AN ESTER OF AN ETHOXYLATED AROMATIC ALCOHOL

This application is a continuation of application Ser. No. 083,932 filed Aug. 5, 1987, now abandoned, which is a continuation of application Ser. No. 922,909 filed Oct. 24, 1986, now abandoned.

BACKGROUND OF THE INVENTION

This invention relates to linear saturated polyester compositions. More particularly, the invention is directed to a linear saturated polyester composition containing at least one ester of an ethoxylated aromatic alcohol.

Molding formulations based on linear saturated polyesters, such as polyethylene terephthalate, should result in a molded product having good physical properties including flexural strength, modulus, tensile strength, and impact properties. The molding compound should have good molding properties, including a melt flow index for sufficient flow into the mold, good mold release properties and good surface finish appearance. The molded article should be crystalline and warp resistant.

It is desirable that satisfactory properties be attained using water heated molds. That is, molds heated to temperatures between 76.7° C. (170° F.) to about 110° C. (230° F.). In order to accomplish this, it is desirable for crystallization to begin at as high a temperature as possible upon the cooling of the molten polyester which was fed into the mold, and continue during the cooling to as low a temperature as possible. $T_{cc}$ is a measurement to determine at what temperature crystals first appear upon cooling from the melt. $T_{ch}$ is a measurement which indicates the temperature at which crystallization is no longer occurring upon cooling. It has been found that mold appearance and mold release properties can be related to $T_{ch}$. $T_{ch}$ is determined by measuring the temperature at which crystals appear upon heating an amorphous piece of polyester. $T_{cc}$ and and $T_{ch}$ can be measured using a Differential Scanning Calorimeter.

A variety of additives are disclosed in the art for use with linear saturated polyester compositions. Two important classes of additives include nucleators and plasticizers. Plasticizers include a variety of low molecular weight esters such as those disclosed in U.S. Pat. Nos. 4,223,125 and 4,435,546. These patents describe the use of esters of alcohols having up to 20 carbon atoms and preferably having a carbon bond to ester bond ratio of between 4 and 15, inclusive of the carbonyl atom.

It is known to use nucleating agents in crystallizable polymers, such as linear saturated polyesters of aromatic dicarboxylic acids. U.S. Pat. Nos. 3,435,093; 3,516,957; and 3,639,527 disclose various approaches to molding thermoplastic compositions of linear saturated polyesters of aromatic dicarboxylic acids, and are particularly applicable to polyethylene terephthalate. These patents generally disclose the use of salts of hydrocarbon and polymeric carboxylic acids as nucleating agents for linear saturated polyesters. Great Britain Pat. No. 1,315,699 discloses the use of low molecular weight sodium, lithium or barium salts of mono- or polycarboxylic acids used with solid, inert inorganic substances.

The use of organic esters in combination with nucleators is disclosed in U.S. Pat. Nos. 3,516,957; 4,352,904; 4,486,564; 4,429,067; 4,223,125; 4,435,546; and 4,548,978. These patents disclose the use of a variety of plasticizers including specific ester compounds used in combination with other materials.

SUMMARY OF THE INVENTION

The present invention is a composition comprising a linear saturated polyester and from 0.5 to 30 percent by weight of the polyester of at least one ester of an ethoxylated aromatic alcohol, preferably ethoxylated Bisphenol A. The ester has a molecular weight of from 500 to about 1,500. The ethoxylated aromatic alcohol has the formula

wherein R is the same or different hydrocarbon radicals of from 2 to 4 carbon atoms, n can be the same or a different integer of from 2 to 15. By the "same or different" it is meant that where the symbol R or n appear more than once in a general formula it can be the same or different in that formula. The alcohol has greater than 20 carbon atoms. $R^1$ is an aromatic diradical preferably derived from an aromatic dialcohol, most preferably bisphenol A. Ethoxylated bisphenol A has the formula

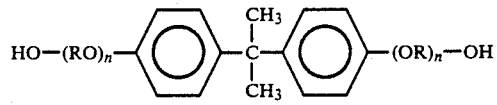

The acid is a carboxylic acid of from 1 to 25 and preferably 3 to 10 carbon atoms, and from 1 to 10 carboxyl groups. Preferably the acid is aliphatic has from 3 to 10 carbon atoms and one carboxyl group.

The composition of the present invention preferably contains a nucleating agent and optionally filler or reinforcing material, an impact modifier, an epoxy compound, and other conventional additives such as antioxidants, colorants, flame retardants and the like.

Objects, features, and advantages of the present invention will become apparent by reference to the following specification:

DESCRIPTION OF THE PREFERRED EMBODIMENTS

The present invention is a composition comprising a linear saturated polyester, and from 0.5 to 30, preferably 1.0 to 10, and more preferably 1.5 to 8, and most preferably 1.5 to 5 percent by weight of the polyester of at least one ester of an ethoxylated aromatic alcohol and wherein the ethoxylated aromatic alcohol has the formula

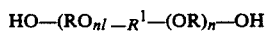

wherein R is the same or different hydrocarbon radicals of from 2 to 4 carbon atoms, and n can be the same or a different integer of from 2 to 15. By the "same or different" it is meant that where the symbol R or n appear more than once in a general formula it can be the same or different in that formula. $R^1$ is an aromatic radical, preferably derived from an aromatic dialcohol, most preferably bisphenol A. The ethoxylated alcohol has greater than 20 carbon atoms and preferably 25 to 50 carbon atoms. The alcohol is esterified with an acid which is a carboxylic acid of from 1 to 25 carbon atoms, preferably 3 to 10 carbon atoms. The acid is preferably an aliphatic acid. The acid has from 1 to 3 carboxyl groups and preferably 1 to 2 carboxyl groups with one carboxyl group most preferred. The ester formed has a molecular weight of from 500 to 1500 preferably 700 to about 1,200, and more preferably 800 to 1,000.

The preferred ethoxylated aromatic alcohols are derived from aromatic dialcohols having from at least six carbon atoms and preferably from 6 to about 15 carbon atoms. The aromatic portion of the aromatic dialcohol can contain substituents groups which do not make the plasticizer ineffective. Such groups could include hydrocarbons such as methyl groups, ester groups, halogen containing groups and the like. Preferred aromatic dialcohols, include bisphenol A, resorcinol, dihydroxynapthalene (i.e., 2,6 dihydroxynapthalene), and biphenol, with bisphenol A being most preferred. The ethoxylated bisphenol A has the formula

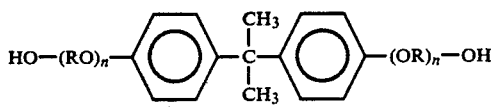

Preferably R is —$CH_2CH_2$— and n is from 3 to 5, and more preferably, n is 5.

The carboxylic acid has from 1 to 25 and preferably from 3 to 10 carbon atoms and preferably from 1 to 3, and most preferably one carboxyl group. The most preferred carboxylic acid is an aliphatic carboxylic acid with from 3 to 10 carbon atoms and 1 carboxyl group. Useful acids include, but are not limited to, acetic acid, butyric acid, caproic acid, caprylic acid, pelargonic acid, 2-ethylhexanoic acid, lauric acid, myristic acid, palmitic acid, stearic acid, oleic acid, ricinolic acid, 2-ethyl butyric acid, tall oil acids, fatty acids, and the like. The most preferred acid is 2-ethylhexanoic acid. Di- and tri-carboxylic acids which are useful include adipic acid, azelyic acid, citric acid, fumaric acid, maleic acid, glutaric acid, succinic acid, tartaric acid, and sebacic acid. The above list of acids is illustrative rather than limiting.

A preferred ester of the present composition is di-2-ethylhexoate of an ethoxylated Bisphenol A having the formula:

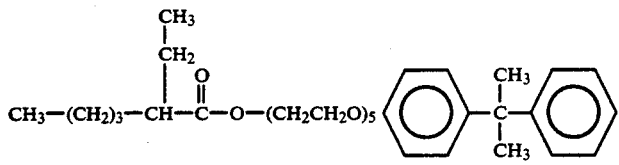

having a molecular weight of 876.

The composition of the present invention includes linear, saturated polyesters of aromatic dicarboxylic acids. The preferred linear saturated polyesters include polyethylene terephthalate, polybutylene terephthalate, and poly(1,4-cyclohexane dimethylene terephthalate), and mixtures thereof. Polyethylene terephthalate is the most preferred due its ability to be molded at low molding temperatures. The polyethylene terephthalate has an intrinsic viscosity range between about 0.3 and about 1.20, with a preferred intrinsic viscosity range between about 0.4 and 0.7. Intrinsic viscosity is obtained by extrapolation of viscosity values to zero concentration of solutions of poly(ethylene terephthalate) in a 60 to 40 weight/volume ratio of phenol and tetrachloroethane. The measurements are normalized to 25° C. The preferred polyethylene terephthalate melts between about 250° C. and 275° C. The polyethylene terephthalate can contain minor amounts, up to 10%, of other comonomers such as 1,4-cyclohexyldimethyldiol, butylenediol, neopentyldiol, diethylene glycol, or glutaric acid.

It has been found that the ester of the present invention acts as plasticizer in that they lower the $T_{ch}$ thereby allowing crystallization to take place as the polyester composition cools to lower temperatures. The plasticizing effect has been found to improve mold release properties and molded appearance of molded polyester, preferably polyethylene terephthalate articles. $T_{ch}$ is the temperature at which crystal formation occurs upon heating an amorphous piece of polyester. $T_{ch}$ is measured as the maximum of the peak of the curve formed when the amorphous polyester is heated in a Differential Scanning Calorimeter (DSC). Typically the polymer is heated at 10° C./minute. The use of a plasticizer reduces the $T_{ch}$. The $T_{ch}$ for pure polyethylene terephthalate (0.5 intrinsic viscosity) is approximately 125° C.-130° C. It is desirable to lower this value as much as possible for the best mold release and molded article release properties. The $T_{ch}$ is preferably not greater than about 110° C. It has been decreased to about 94° C. using 5 percent, based on the weight of the polyethylene terephthalate, of the present invention.

The use of the relatively high molecular weight ester of the present invention as plasticizers has been found to improve plasticization as indicated by the low $T_{ch}$. Additionally, the use of high molecular weight ester of the present invention has been found to provide advantages including low volatility, attributed to its relatively high molecular weight and at the same time results excellent molded surface appearance.

It is believed that the presence of the aromatic group enhances compatibility of the esters with polyesters containing aromatic groups such as polyethylene terephthalate resulting in easier incorporation of the ester of the ethoxylated aromatic alcohol. It has been found that consistent with the disclosure of U.S. Pat. No. 4,223,125 that this material is somewhat difficult to uniformly incorporate into the polyester composition. This is believed to be the results of it not being as compatible as plasticizers such as those disclosed in the U.S. Pat. No. 4,223,125.

The composition of the present invention preferably contains nucleating agents in combination with the polyester and plasticizer. The most useful nucleating agent is at least one compound containing a sodium cation or a potassium cation. The nucleating agent is preferably the sodium salt of a carboxylic acid, which is most preferably a hydrocarbon carboxylic acid. Useful nucleating agents include the sodium or potassium salts of hydrocarbon acids containing from 3 to at least 54 carbon atoms and from 1 to 3 carboxyl groups. The hydrocarbon acids can be aromatic or aliphatic acids. Preferred nucleating agents include the sodium salts of a carboxyl containing organic polymer. Such a polymer can contain one or more sodium neutralized carboxyl group. Preferred polymeric sodium salts include copolymer acids which are the copolymers of an α-olefin and an α,β-ethylenically unsaturated carboxylic acid. The copolymer molecule can include additional materials including esters and other substituents. The α-olefin is preferably ethylene. The concentration of ethylene in the copolymer is at least 50 mol percent and preferably from 80 to 95 percent by weight. The α,β-ethylenically unsaturated carboxylic acid can be a monocarboxylic acid, or have more than one carboxylic group. The α,β-ethylenically unsaturated carboxylic acid which can be copolymerized with the α-alpha olefin preferably has 3 to 8 carbon atoms. Examples of such acids include acrylic acid, methacrylic acid, ethacrylic acid, itaconic acid, maleic acid, fumaric acid, and monoesters of other dicarboxylic acids, such as methyl hydrogen maleate, methyl hydrogen fumarate, ethyl hydrogen fumarate, and maleic anhydride which is considered to behave like an acid and be an acid in the present invention. Useful copolymer salts include those disclosed in U.S. Pat. No. 4,412,040 and U.S. Pat. No. 3,435,093, both hereby incorporated by reference. Preferred nucleators are the sodium salts of copolymers of ethylene and α,β ethylenically unsaturated carboxylic acids having a number average molecular weight of from 500 to 6000 as described in U.S. Pat. No. 4,412,040. These salts are preferably neutralized from 50 to 100%.

Another preferred nucleator for use in combination with the present invention are nucleating agents which are of the type described in U.S. Pat. No. 4,357,268 hereby incorporated by reference. These include sodium or potassium salts of dimer acids, trimer acids, or mixtures of the two. The dimer acid has at least 36 carbon atoms and 2 carboxyl groups and the trimer acid has at least 54 carbon atoms and 3 carboxyl groups. The definition of dimer acid is a high molecular weight dibasic acid, which is liquid (viscous), stable, resistant to high temperatures. It is produced by the dimerization of unsaturated fatty acids, at mid-molecule and usually contains 36 carbon atoms. Trimer acids, which usually contain 3 carboxyl groups and 54 carbon atoms are similarly prepared.

The temperature at which crystal formation occurs is indicated by $T_{cc}$. The $T_{cc}$ is measured using a Differential Scanning Calorimeter which measures the heat evolved versus temperature. Between 5 and 10 milligrams of sample is prepared. The sample can be made in the form of a compression molded film which is vacuum dried or as a pellet which is hammered flat. The sample is placed in the Differential Scanning Calorimeter and heated to 280° C. where it is held for two minutes. The sample is cooled at 10° C. per minute. The $T_{cc}$ is the temperature at which the crystallization takes place. The $T_{cc}$ is approximately 195° C. to 200° C. for polyethylene terephthalate having an intrinsic viscosity normalized to about 0.50. It is desirable for crystallization from the melt to begin at as high a temperature as possible without adversely affecting other properties. This allows crystal nucleation to begin earlier and for crystallization to take place over a greater temperature range. The $T_{cc}$ is preferably at least 205° C., and more preferably at least 210° C.

The preferred polyethylene terephthalate composition should have as high a $T_{cc}$ as possible and as low a $T_{ch}$ as possible, allowing crystal formation and growth over the widest possible temperature range. The $T_{ch}$ is preferably not greater than about 110° C. Therefore, the temperature range over which crystallization can occur is from about 220° C. to about at least as low as 110° C. during cooling of the composition of the present invention. The range for pure polyethylene terephthalate is about 195° C. to 125° C.

The composition can optionally contain other additives such as inert nucleating agents (i.e., talc), filler or reinforcing materials, impact modifiers, epoxies, antioxidants, colorants, flame retardants, and the like.

Any suitable filler and/or reinforcing agent can be used. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, etc. The foregoing recited fillers are illustrative only and are not meant to limit the scope of the fillers that can be utilized in this invention. As noted above, the most preferred filler is glass fibers. There is up to 150 percent by weight of the polyethylene terephthalate of filler, and preferably 30 percent to 90 percent by weight of the polyethylene terephthalate of filler, preferably fiberglass.

The composition preferably includes impact modifiers known for use in polyester compositions. Preferred impact modifiers are ethylene copolymers and terpolymers having carboxylic acids or derivatives. Preferably copolymers of ethylene and carboxylic acids, their esters or salts can be used as impact modifiers. Included among those impact modifiers are the following copolymers: ethylene-acrylic acid, ethylene-methacrylic acid, ethylene-ethyl acrylate, ethylene-vinyl acetate, and mixtures thereof. Useful impact modifiers include copolymers of α-olefins and the metal salts of carboxylic acids and particularly the sodium and potassium salts. These copolymer salts both nucleate and improve impact resistance. There can be used up to about 30 percent, and preferably from about 2 percent and about 10 percent of the impact modifier, based on the weight of the poly(ethylene terephthalate).

The composition can contain up to about 5 percent based on the weight of the polyethylene terephthalate, of a polyepoxide. Useful polyepoxides are epoxy cresol novolac resins of the type produced by Ciba-Geigy Corporation, and include ECN ™ 1234, 1273 and 1299, and those formed from bisphenol-A and glycidyl ether. A preferred polyepoxide is an epoxy formed from bisphenol-A and glycidyl ether. Preferably, there is from 0.5 percent to 4.0 percent, based on the weight of the polyethylene terephthalate, of a polyepoxide formed from a diglycidyl ether and bisphenol A having a molecular weight of from about 1500 to 4000 and most preferably about 2000. The polyepoxides act as chain extenders and help compensate for polyethylene terephthalate chains broken by hydrolysis.

A preferred filled composition comprises polyethylene terephthalate, from 30% to 90 percent glass fibers and 2% to 8% of the ester of the present invention from, 0.6 to about 3 percent of a polyepoxide and from about 0.1 to about 10 percent of a sodium carboxylate salt as described above. The percents are based on the weight of the polyethylene terphthalate.

As indicated in the examples to follow, the use of the ester of the present invention results in the polylinear saturated polyester, such as polyethylene terephthalate, molding composition which can be injection molded into water heated molds as temperatures as low as 76.7° C. (170° F.). As the mold temperature increases, there is an improvement in molded article appearance. The ester of the present invention, the carboxylate salt and polyethylene terephthalate are melt blended. In the most preferred embodiment, they can be melt blended in an extruder at a temperature above the melt temperature of the polyester. In a preferred embodiment, the components are melt blended at a temperature between 260° C. (500° F.) and 316° C. (600° F.) in an extruder.

The polyethylene terephthalate composition of the present invention can be formed by blending the components together by any convenient means to obtain an intimate blend. Neither temperature nor pressure are critical. For example, the polyethylene terephthalate can be mixed dry in a suitable blender or tumbler with the other components and the mixture melt extruded. The exudate can be chopped. If desired a reinforcing or filling agent can be omitted initially and added after the first melt, and the resulting mixture can be melt extruded. It has been observed that the composition can be uniformly extruder blended. Uniform blends were made when all the ingredients were fed into the throat of the extruder. Uniform blends were made with the polyester was fed into the throat and all of the additives including small amounts of polyester, the fiberglass and the plasticizer were added together downstream of the throat. A third method is to inject the plasticizer after all of the materials are added downstream. This method results in uniform blends under high shear conditions such as are present in a twin screw extruder.

The general incompatibility of the higher molecular plasticizer of the present invention makes its uniform incorporation an important consideration. It has been found that the aromatic plasticizer was easier to incorporate than the aliphatic diester plasticizers such as used in Comparatives 2 and 3 below. Poor dispersion is evidenced by the appearance of fiberglass showing at the surface.

The composition of the present invention is particularly useful to make injection molded articles.

The examples and compositions set forth below illustrate the nature of the invention and the manner of carrying it out. However, the invention should not be considered as being limited to the details thereof. All parts are percent by weight unless otherwise indicated.

EXAMPLES

All of the following examples were made using polyethylene terephthalate having an intrinsic viscosity (IV) in the range of 0.66 to 0.72. Intrinsic viscosity is measured by extrapolation of the viscosity values to zero concentration of solutions of polyethylene terephthalate in a 60 to 40 volume ratio of phenol and tetrachloroethane. The measurements are normalized to 5° C. In the results that follow the IV was measured on extruded pellets and molded parts. Unless otherwise indicated, the parts were ⅛ inch thick tensile bars molded at 1.5 ounce Arburg injection molding machine at about 590° C. barrel melt temperature with the mold temperature between about 200° F. to 230° F.

The fiberglass used was ⅛ inch long short glass fibers made by Pittsburgh Plate Glass as PPG 3540. The epoxy compound used in the compositions was a diglycidyl ether of Bisphenol A sold by Ciba-Geigy as Araldite 7074. The ethylene acrylic acid (EAA) copolymer used was manufactured by Dow Chemical Corporation as Dow EAA-445 which is described as having 8 percent by weight acrylic acid and a melt index of 5.5g/10 min. The ethylene ethyl acrylate copolymer (EEA) used was made by Union Carbide as Bakelite ® flexible ethylene copolymer DPD-6169 which is described as having a melt index of 6g/min and an ethyl acrylate content of 18 weight percent. The ethylene methyl acrylate copolymer (EMA) used was 80 mol percent ethylene, but a density of 0.942 and had a melting point of 59° C and was produced by Chevron Chemical. Irganox ® 1010 which is tetrakis [methylene 3-(3,5 di-tertiary butyl 4 hydroxyphenyl) proprionate] methane made by Ciba-Geigy, was used as an antioxidant. A processing aid S-160 which is butyl benzyl phthalate made by Monsanto Corporation was used to prevent powder/pellet separation prior to extrusion.

In each of the Examples and comparatives that used a sodium dimerate salt as the nucleator, a dimer acid was used which was 100% sodium neutralized with sodium cation. The dimer acid is sold by Emery Corp. as Empol ® 1024. The dimer salt was used as a preblend (PB) contained 0.6% dimer acid sold, 0.6% EEA, 2.8% EAA, and 0.1% S-160. Alternately, as indicated, the nucleator was the sodium salt of ethylene methacrylic acid sold by the DuPont Company as Surlyn ® 8920.

Unless otherwise indicated, the compositions were made by melt extruding using a 2½" Egan single screw extruder having a 40 L/D ratio. The temperatures in Zones 1-7 were Zone 1-500° F./Zone 2-540° F./Zone 3-530° F./Zones 4-7 -525° F. with the die at 540° F. The fiberglass was fed into Zone 2 and a vacuum of 10 inches was applied to Zone 3.

Differential Scanning Calorimeter (DSC) values were measured in accordance with the above-described procedure. Between a 5 and 10 milligram sample is prepared. The sample is made in the form of a film which is vacuum dried. The sample is placed in the DSC and heated at 10° C./min. to 280° C. where it is held for 2 minutes. The sample is cooled at 10° C. per minute. The $T_{cc}$ appears as the peak in the cooling branch of the curve. Tg is the glass transition temperature of the composition.

$T_{ch}$ is measured using similar sample preparation. The sample was melted and then quenched to assure that the sample was substantially amorphous. The sample was heated at 10° C. per minute and a crystallization curve forms when crystallization takes place. The $T_{ch}$ was the temperature at the peak of the curve.

The volatility was measured as percentage weight loss upon heating at the indicated temperature. Mold surface ratings are based on visual appearance ratings of 1 to 10 with 1 being the best and 10 being the worst.

The following ASTM test procedures were used to measure physical properties: Tensile Strength - ASTM D638; Flexural Strength and Modulus - ASTM D790; and Notched Izod Impact Testing - ASTM D256.

Compositions were made using a preferred plasticizer and various comparative plasticizers. The amounts of the plasticizers were varied as indicated.

The examples illustrate the use of plasticizer "P" made by C. P. Hall and which is the di-2-ethyhexoate of ethoxylated Bisphenol A having a molecular weight of 876 and the formula

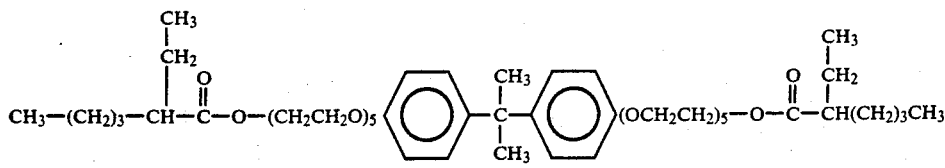

In various Comparative Examples, the plasticizer used was polyethylene glycol di-2-ethylhexoate (PE diester) having a molecular weight of 652 and sold by C. P. Hall as Tegmer 809.

Another Comparative used was an aliphatic ethoxylated triester (PE triester) made by C. P. Hall having a molecular weight of 998 and having the formula

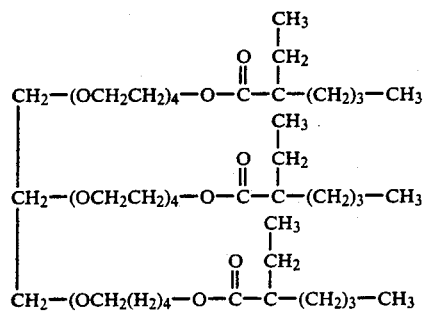

EXAMPLE 1

Example 1 illustrates a composition using plasticizer P compared to PE triester. The composition and results are summarized in Table 1.

TABLE I

|  | Ex 1 | Comp 1 |
| --- | --- | --- |
| PET | 61.15 | 61.15 |
| Fiberglass | 30.00 | 30.00 |
| PB[1] | 4.10 | 4.10 |
| Epoxy | 1.0 | 1.0 |
| Antioxidant | .15 | .15 |
| Plasticizer (%) | 3.6 | 3.6 |

TABLE I-continued

|  | Ex 1 | Comp 1 |
| --- | --- | --- |
| Plasticizer | P | PE triester |
| Plasticizer MW | 876 | 998 |
| Molded Surface |  |  |
| @ 225° F. Mold | 2½-3 | 2 |
| @ 215° F. mold | 6 | 5 |
| Flex Str. (psi) | 28,800 | 31,000 |
| Mod × 10$^6$ (psi) | 1.16 | 1.18 |
| Notched Izod ft lbs/in notch | 1.86 | 1.76 |
| IV Molded Bar |  |  |
| ¼" thick | .60 | .59 |
| 1/16" thick | .52 | .48 |

[1]PB is a preblend of sodium dimer salt, EEA and EAA.

[1]PB is a preblend of sodium dimer salt, EEA and EAA.

The above results indicate that the plasticizer P and the PE triester both resulted in a satisfactory composition. As the mold temperature was reduced from 225° F. surface appearance was poorer.

EXAMPLES 2–5

Examples 2–5 are a comparison of PET compositions melt blended using a 1 inch single screw extruder having a 25L/D ratio. The extruder was run at barrel temperature of about 540° F. The plasticizer P used in Example 5 was the same ester of ethoxylated bisphenol A but from a different batch than the plasticizer used in Examples 2–4 to check lot to lot variation. The plasticizer in Comparatives 2 and 3 used the PE diester (MW-652) as described above. The compositions and test results are summarized in Table 2 below.

TABLE II

|  | Ex. 2 | Comp 2 | Ex. 3 | Ex. 4 | Ex. 5 | Comp 3 |
| --- | --- | --- | --- | --- | --- | --- |
| PET | 61.15 | 61.15 | 59.25 | 59.25 | 59.25 | 59.25 |
| Fiberglass | 30.00 | 30.00 | 30.00 | 30.00 | 30.00 | 30.00 |
| PB | 4.10 | 4.10 | 4.10 | — | 4.10 | 4.10 |
| Surlyn 8920 | — | — | — | 4.10 | — | — |
| Epoxy | 1.0 | 1.10 | 1.00 | 1.00 | 1.00 | 1.00 |
| Antioxidant | .15 | .15 | .15 | .15 | .15 | .15 |
| Plasticizer | 3.6 | 3.6 | 5.5 | 5.5 | 5.5 | 5.5 |
| Plasticizer Type | P | PE diester | P | P | P | PE diester |
| Molded Surface @ |  |  |  |  |  |  |
| 200° F. | — | — | — | 7 | 7 | 4 |
| 215° F. | — | — | 5 | 1½ | 5 | 1 |
| 225° F. | 3 | Best[1] | — | 1 | Best[1] | Best[1] |
| Flex Str (psi) | 30,600 | 29,600 | 28,500 | 31,000 | 28,700 | 27,300 |
| Flex Mod × 10$^6$ (psi) | 1.21 | 1.18 | 1.13 | 1.17 | 1.15 | 1.11 |
| Tensile (psi) | 19,600 | 18,600 | 18,300 | 20,300 | 18,700 | 17,700 |
| Notched Izod (ft-lb/in Notch) | 1.66 | 1.75 | 1.59 | 1.86 | 1.53 | 1.47 |
| DSC Tg | 56 | — | 58 | — | 56 | 49 |
| Tch | 101 | — | 102 | — | 100 | 90 |
| Tcc | 209 | — | 205 | — | 210 | 208 |

[1]Best indicates that these samples were the Best of the samples rated as "1".

The above results indicate that at lower levels of plasticizer, 3.6%, the PE diester plasticizer has a better surface appearance than the plasticizer P, with comparable physical properties. At higher levels of plasticizer, 5.5% the physical properties when using the PE diester are poorer than when using plasticizer P of the present invention. Additionally, the molded surface when using 5.5% plasticizer of the present invention is almost equal to the molded surface when using plasticizer PE diester.

EXAMPLE 6

In Example 6 and Comparatives 4 and 5 the short glass fiber was fed into the throat of the extruder. Volatility was measured n an oven at a vacuum of 27-28 inches of mercury at the indicated time and temperature.

TABLE III

|  | EX. 6 | COMP. 4 | COMP. 5 |
|---|---|---|---|
| PET | 62.05 | 62.05 | 62.05 |
| Fiberglass | 30.00 | 30.00 | 30.00 |
| Surlyn 8920 | 4.00 | 4.00 | 4.00 |
| Sodium Stearate | 0.2 | 0.2 | 0.2 |
| Epoxy | 1.0 | 1.0 | 1.0 |
| Antioxidant | .15 | .15 | .15 |
| Plasticizer | 2.6 | 2.6 | 2.6 |
| Plasticizer Type | P | PE diester | PE triester |
| Molded Surface @ |  |  |  |
| 215° F. | 2½ | 1½ | 1½ |
| 225° F. | 1 | Best | 1 |
| Flex Str (psi) | 34,300 | 34,000 | 32,800 |
| Flex Mod (psi) | 1.24 | 1.21 | 1.24 |
| Tensile (psi) | 22,000 | 22,200 | 21,700 |
| Unnotched Izod (ft-lb/in) | 1.7 | 1.19 | 1.6 |
| IV - Pellets | .50 | .50 | .47 |
| molded part | .49 | .52 | .46 |
| Volatility % weight loss in 5 hours @ |  |  |  |
| 127° C. | .05 | .090 | .033 |
| 124° C. | .045 | .090 | .033 |
| 116° C. | .017 | .050 | .016 |
| DSC Tg (°F.) | 60 | 58 |  |
| Tch | 99 | 97 |  |
| Tcc | 209 | 209 |  |

The plasticizer P of the present invention resulted in a composition which was generally comparable in physical properties with compositions containing the PE diester (Comp. 4) and the PE triester (Comp. 5). The composition with the PE diester had the Best surface appearance. The composition of Ex. 6 and Comp. 5 had similar volatility results with Comp. 5 being slightly better. Comp. 4 had the poorest volatility.

EXAMPLES 7-12

Examples 7-12 illustrate preferred compositions using a low molecular weight sodium ionomer salt as a nucleator. There was variation in the amount of neutralization with sodium cations of a low molecular weight ethylene acrylic acid copolymer sold as A-C® 120 by Allied Corp. (NaAC) which was neutralized to the percent indicated. Example 12 contained 1.2 weight percent of a masterbatch (MB) which was made from 80 parts of PET, 20 parts of sodium stearate (SST), and 40 parts of EMA. Results are summarized in Table 4 below:

TABLE 4

|  | Ex 7 | Ex 8 | Ex 9 | Ex 10 | Ex 11 | Ex 12 |
|---|---|---|---|---|---|---|
| PET | 62.05 | 62.00 | 62.00 | 61.75 | 61.45 | 60.95 |
| Fiberglass | 30.00 | 30.00 | 30.00 | 30.00 | 30.00 | 30.00 |
| EMA | 2.2 | 2.2 | 2.2 | 2.2 | 2.2 | 2.2 |

TABLE 4-continued

|  | Ex 7 | Ex 8 | Ex 9 | Ex 10 | Ex 11 | Ex 12 |
|---|---|---|---|---|---|---|
| SST | 0.10 | .15 | .15 | .10 | .10 | — |
| Epoxy | .9 | .9 | .9 | .9 | .9 | .9 |
| Antioxident | .15 | .15 | .15 | .15 | .15 | .15 |
| Plasticizer "P" | 2.6 | 2.6 | 2.6 | 2.6 | 2.6 | 2.6 |
| MB | — | — | — | — | — | 1.2 |
| 90% NaAC | 2.0 | — | — | — | — | — |
| 80% NaAC | — | 2.0 | — | 2.3 | — | — |
| 70% NaAC | — | — | 2.0 | — | 2.6 | 2.0 |
| Molded Surface @ 220° F. | 2 | 2 | 2 | 2 | 2 | 2 |
| Ash (%) | 29.2 | 28.1 | 28.8 | 28.4 | 29.3 | 28.2 |
| Min Pressure (psi) to fill a 1/16" Flex Bar mold | 690 | 530 | 540 | 580 | 540 | 525 |
| Flex Str (psi) | 36,300 | 34,100 | 34,200 | 33,600 | 35,000 | 34,200 |
| Flex Mod (psi) | 1.31 | 1.22 | 1.22 | 1.17 | 1.26 | 1.22 |
| Tensile (psi) | 23,600 | 21,800 | 22,200 | 21,600 | 22,250 | 22,600 |
| Notched Izod (ft-lbs/in notch) | 2.02 | 2.10 | 2.06 | 2.05 | 2.04 | 2.11 |
| Unnotched Izod (ft-lbs/in) | 22.4 | 22.7 | 21.8 | 20.6 | 20.6 | 20.9 |
| DSC Tg | 69 | 69 | 70 | 67 | 68 | 66 |
| Tch | 106 | 105 | 105 | 103 | 103 | 105 |
| Tcc | 214 | 216 | 217 | 218 | 218 | 215 |
| IV Pellets | .56 | .56 | .56 | .55 | .57 | .56 |
| IV Parts | .60 | .57 | .61 | .57 | .56 | .57 |

These results illustrate a composition containing the preferred plasticizer and nucleator.

EXAMPLES 13-19

Examples 13 to 19 were extruded as above except that the fiberglass, and the additives were added at Zone 2 followed by the addition of plasticizer downstream from the other additives fed into Zone 2 of the extruder. The PET (hot) was heated and dried at 275° F. and added in the throat. A small amount of room temperature (cold) PET was added with the additives other than the plasticizers. The compositions evaluated and results are summarized in Table 6 below:

TABLE 6

|  | Ex 13 | Ex 14 | Ex 15 | Ex 16 |
|---|---|---|---|---|
| PET (hot) | 58.4 | 58.4 | 58.4 | 58.4 |
| PET (cold) | 3.6 | 3.6 | 3.6 | 3.6 |
| Epoxy | 1.0 | 1.0 | 1.0 | 1.0 |
| Antioxidant | .15 | .15 | .15 | .15 |
| NaAC (90% N) | 2.0 | 2.4 | 1.8 | — |
| SST | .2 | — | .2 | .2 |
| Surlyn 8920 | — | — | — | 4.0 |
| EMA | 2.0 | 2.0 | 2.2 | — |
| Plasticizer "P" | 2.6 | 2.6 | 2.6 | 2.6 |
| Fiberglass | 30 | 30 | 30 | 30 |
| Dioctyladipate | .08 | .08 | .08 | .08 |
| Paraffin Wax | — | — | — | — |
| Molded Surface @ 220° F. | 2½ | 3 | 2½ | 4 |
| DSC Tg | 67 | — | — | 67 |
| Tch | 106 | — | — | 107 |
| Tcc | 213 | — | — | 212 |
| Flex Str (psi) | 36,100 | 35,500 | 35,400 | 35,900 |
| Flex Mod (psi) × $10^6$ | 1.28 | 1.26 | 1.26 | 1.27 |
| Notched Izod | 2.02 | 2.13 | 2.03 | 2.24 |
| Unnotched Izod | 20.6 | 21.3 | 21.5 | 22.6 |
| IV Pellet | .57 | .64 | — | .57 |
| Part | .52 | .75 | — | .60 |
| % Ash | 29.9 | 29.8 | 29.9 | 30.4 |
|  | Ex 17 | Ex 18 | Ex 19 |  |

TABLE 6-continued

| | | | |
|---|---|---|---|
| PET (hot) | 58.4 | 56.4 | 47.8 |
| PET (cold) | 3.6 | 3.6 | 2.95 |
| Epoxy | 1.0 | 1.0 | .82 |
| Antioxidant | .15 | .15 | .12 |
| NaAC (90% N) | — | — | — |
| SST | .2 | .2 | .16 |
| Surlyn 8920 | 4.0 | 4.0 | 3.27 |
| EMA | — | — | — |
| Plasticizer "P" | 2.6 | 4.6 | 2.1 |
| Fiberglass | 30 | 30 | 45 |
| Dioctyl adipate | .08 | .08 | .08 |
| Paraffin Wax | .35 | — | — |
| Molded Surface @ 220° F. | 2¼ | 1 | 6 |
| DSC Tg | 64 | 61 | — |
| Tch | 105 | 102 | — |
| Tcc | 213 | 213 | — |
| Flex Str (psi) | 34,600 | 32,400 | 42,400 |
| Flex Mod (psi) × 10⁶ | 1.23 | 1.18 | 1.88 |
| Notched Izod | 2.19 | 2.16 | 2.38 |
| Unnotched Izod | 21.0 | 17.5 | 27.0 |
| IV Pellet | — | — | — |
| Part | — | — | — |
| % Ash | 29.6 | 29.5 | 44.8 |

EXAMPLES 20-21

Examples 20-21 illustrate and impact modified version using an Acryloid ® KM-330 shell/core impact modifier produced by Rohm and Haas. This is believed to have a polybutylacrylate core and a polymethylmethacrylate shell. The compositions evaluated and results are summarized in Table 7.

TABLE 7

| | Ex 20 | Ex 21 |
|---|---|---|
| PET | 51.6 | 51.7 |
| Epoxy | 1.25 | 1.25 |
| Antioxidant | .15 | .15 |
| Surlyn 8920 | — | 3.7 |
| SST | — | 1.7 |
| NaAC (90% N) | .9 | — |
| EMA | 2.1 | — |
| Plasticizer "P" | 3.0 | 3.0 |
| KM330 | 10 | 10 |
| Fiberglass | 30 | 30 |
| Flex Str (psi) | 28,300 | 29,700 |
| Flex Mod × 10⁶ (psi) | 1.16 | 1.13 |
| Tensile St (psi) | 19,400 | 20,000 |
| Notched Izod ft lbs/in notch | 2.16 | 2.41 |
| Unnotched Izod ft lbs/in | 23.3 | 24.9 |

The above evaluation of various example compositions and comparative compositions indicate that the plasticizer of the present invention is a significantly less volatile plasticizer than the esters of difunctional polyethylene oxides as used in Comparative 2. The plasticizer of the present invention is preferred over the PE triester as used in Comparative 1 because it is believed that it is more compatible and therefore is easier to melt blend into a uniform composition. The plasticizer of the present invention had satisfactory molded surface appearance and was easily moldable.

While exemplary embodiments of the invention have been described, the true scope of the invention is to be determined from the following claims.

We claim:

1. A composition comprising:
   (a) polyethylene terephthalate;
   (b) 1 to 10% by weight of the polyethylene terephthalate of

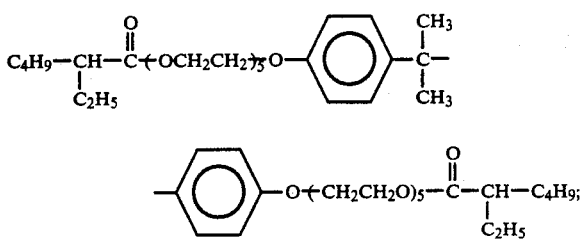

(c) nucleating agent;
   (d) impact modifier;
   (e) reinforcing agent;
   (f) antioxidant; and
   (g) polyepoxide.

2. The composition as recited in claim 1 containing sufficient amounts of the ester and nucleating agents to have a $T_{ch}$ of not greater than 110° C. and a $T_{cc}$ of at least about 205° C.

3. The composition as recited in claim 1 wherein the nucleating agent is the sodium salt of a carboxylic acid.

4. The composition as recited in claim 1 wherein the nucleating agent is the sodium salt of a copolymer of ethylene and an α,β ethylenically unsaturated carboxylic acid, the copolymer having a number and average molecular weight of from 500 to 6000.

5. The composition as recited in claim 1 comprising up to 150 percent based on the weight of the polyethylene terephthalate of said reinforcing agent.

6. The composition as recited in claim 5 wherein there is from about 30 to 90 percent based on the weight of the polyester of fiberglass filler.

7. The composition as recited in claim 1 comprising up to 20 percent of said impact modifier.

8. The composition as recited in claim 7 wherein the impact modifier is a polymer material selected from the group consisting of an α-olefin homopolymer and copolymer of an α-olefin and a carboxylic acid containing moiety or derivative thereof.

9. The composition as recited in claim 8 wherein the impact modifier is a copolymer of ethylene and at least one monomer selected from the group consisting of acrylic acid, ethyl acrylate, methacrylic acid, methyl methacrylate, and the metal salts of acrylic acid, and methacrylic acid.

10. An article molded from the composition as recited in claim 1.

* * * * *

UNITED STATES PATENT AND TRADEMARK OFFICE
CERTIFICATE OF CORRECTION

PATENT NO. : 5,028,647

DATED : July 2, 1991

INVENTOR(S) : John C. Haylock, et al

It is certified that error appears in the above-identified patent and that said Letters Patent is hereby corrected as shown below:

Cover page, column 1, please add as a co-inventor
 --Joseph L. O'Brien, Hinsdale, IL--.

Col. 2, line 55, "$HO-(RO_{n1}-R^1-(OR)_n-OH$" should read --$HO-(RO)_n-R^1-(OR)_n-OH$--

Col. 14, line 30, "$110^o)C$" should read --$110^oC$--.

Signed and Sealed this

Ninth Day of March, 1993

*Attest:*

STEPHEN G. KUNIN

*Attesting Officer*  Acting Commissioner of Patents and Trademarks